E. P. MATHEWSON & F. LAIST.
METALLIZING FURNACE.
APPLICATION FILED DEC. 3, 1913.

1,094,802.

Patented Apr. 28, 1914.
5 SHEETS—SHEET 1.

FIG. I.

WITNESSES:
Harry A. Bennes
J. A. Michel

INVENTORS.
Edward P. Mathewson
Frederick Laist.
BY
ATTORNEY.

E. P. MATHEWSON & F. LAIST.
METALLIZING FURNACE.
APPLICATION FILED DEC. 3, 1913.

1,094,802.

Patented Apr. 28, 1914.
5 SHEETS—SHEET 3.

WITNESSES:
Harry A. Benner
Josamichel

INVENTORS.
Edward P. Mathewson and
Frederick Laist.
BY
Ernest Stark
ATTORNEY.

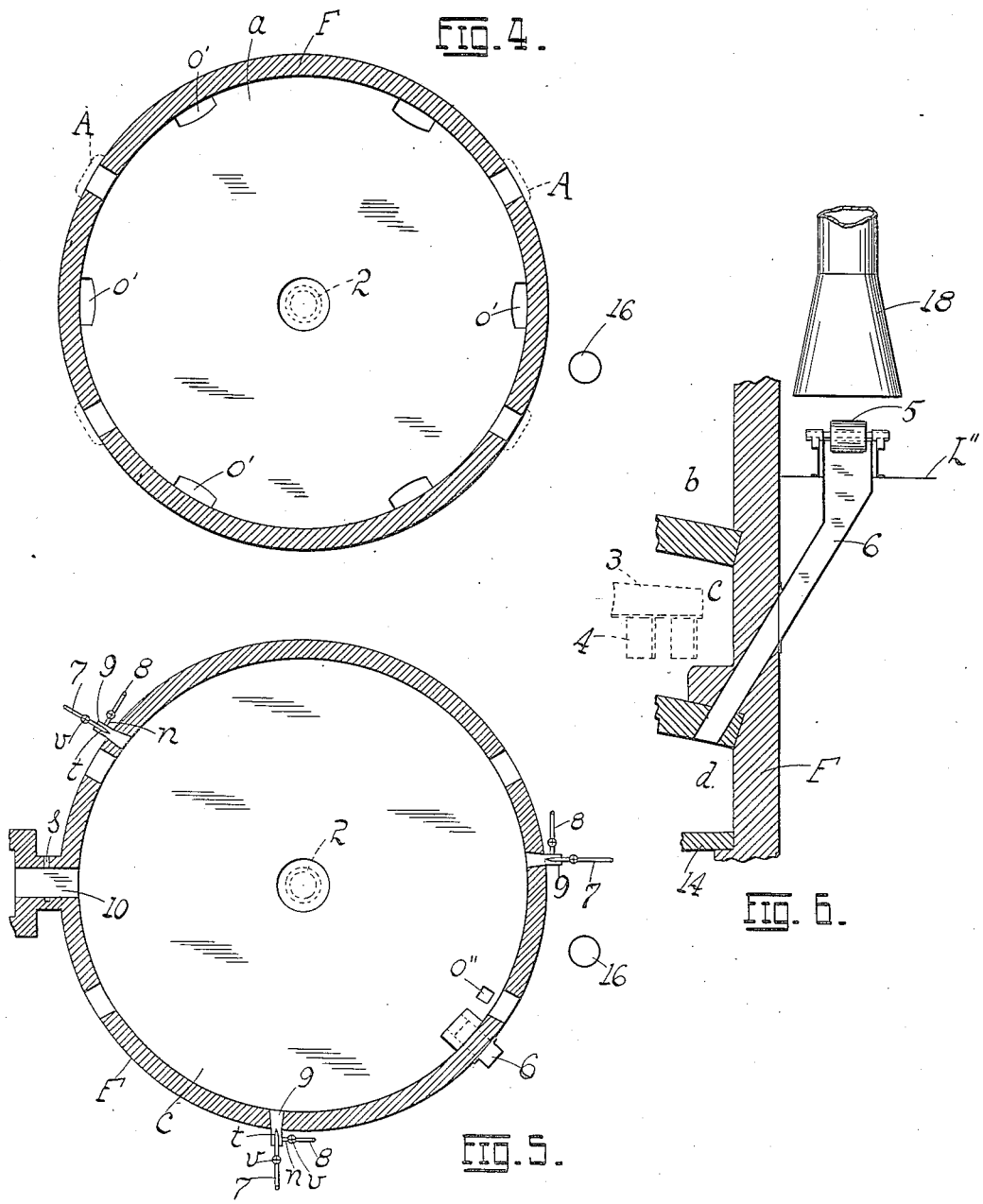

E. P. MATHEWSON & F. LAIST.
METALLIZING FURNACE.
APPLICATION FILED DEC. 3, 1913.

1,094,802.

Patented Apr. 28, 1914.
5 SHEETS—SHEET 5.

WITNESSES:
Harry A. Beimel
Josamichef

INVENTORS.
Edward P. Mathewson &
Frederick Laist.
BY
ATTORNEY.

UNITED STATES PATENT OFFICE.

EDWARD P. MATHEWSON AND FREDERICK LAIST, OF ANACONDA, MONTANA.

METALLIZING-FURNACE.

1,094,802.  Specification of Letters Patent.  Patented Apr. 28, 1914.

Application filed December 3, 1913. Serial No. 804,415.

*To all whom it may concern:*

Be it known that we, EDWARD P. MATHEWSON and FREDERICK LAIST, citizens of the United States, residing at Anaconda, in the county of Deer Lodge and State of Montana, have invented certain new and useful Improvements in Metallizing-Furnaces, of which the following is a full, clear, and exact description, reference being had to the accompanying drawings, forming a part hereof.

Our invention has relation to improvements in metallizing furnaces, that is to say, furnaces in which reduction of an ore or oxid of a metal may be effected without fusion of the charge; and it consists in the novel features of construction more fully set forth in the specification and pointed out in the claims.

Figure 1:
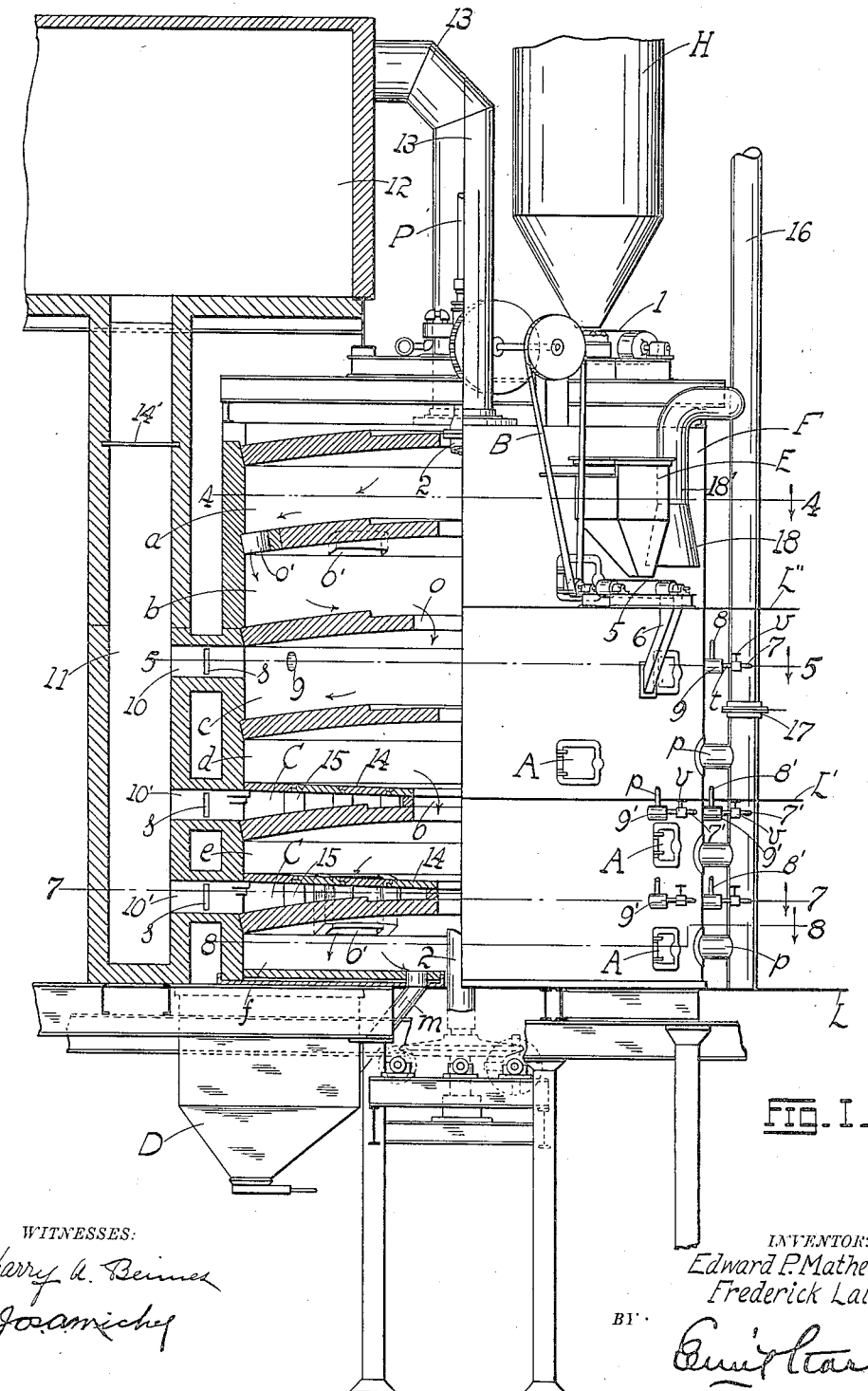
Figure 2:
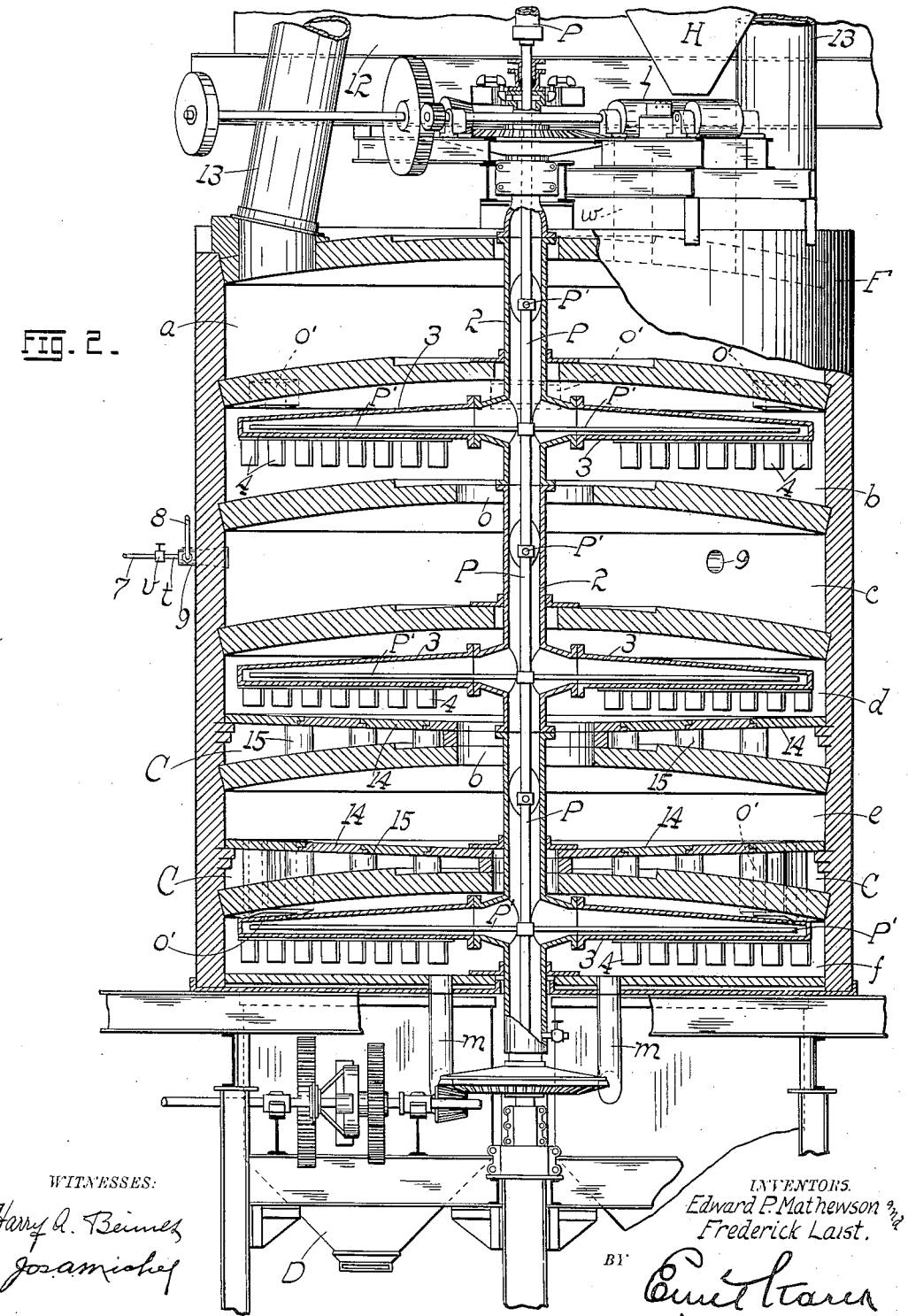
Figure 3:
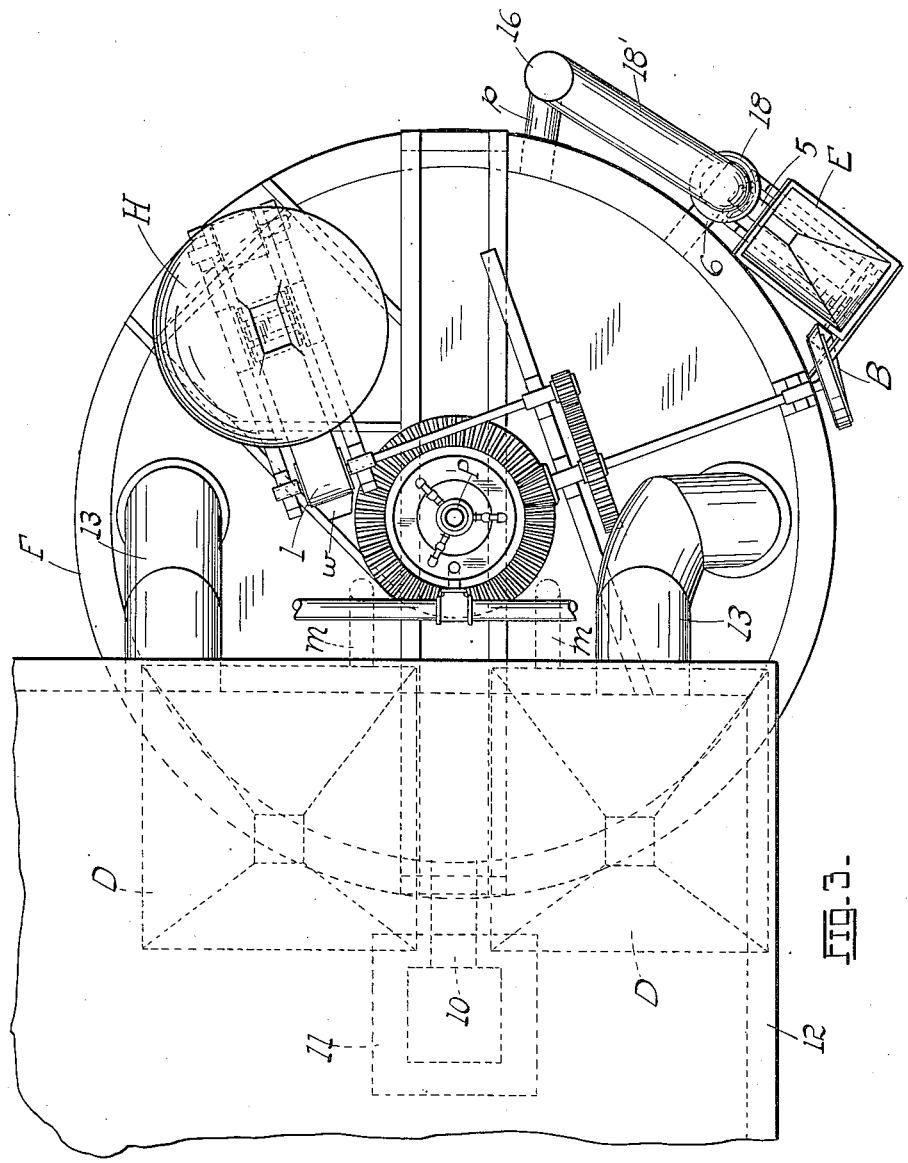
Figure 7:
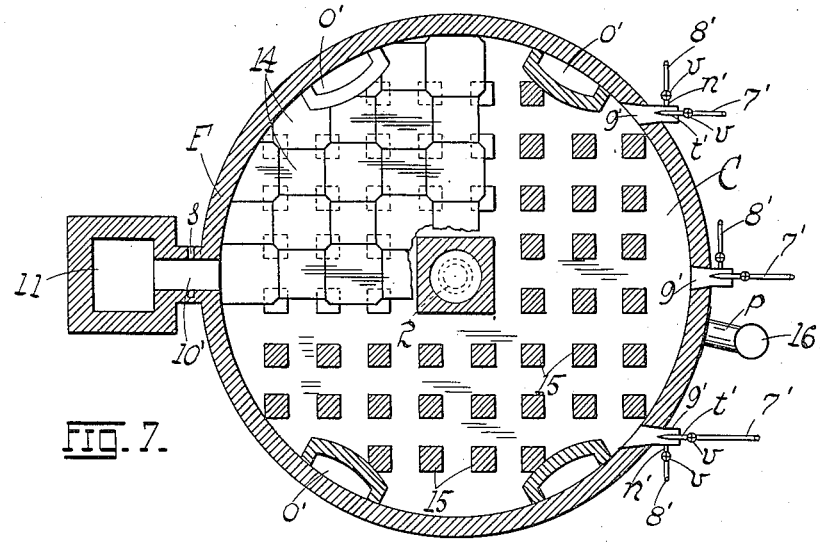
Figure 8:
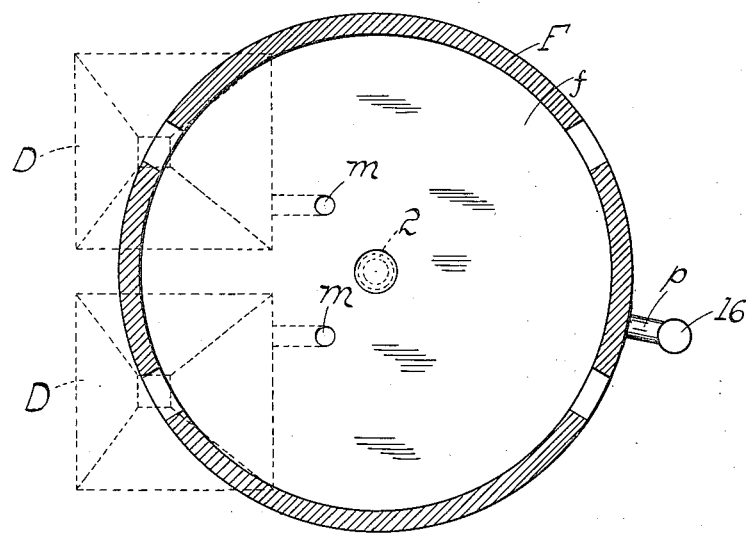

In the drawings, Figure 1 is a combined elevation and vertical middle section of our improved furnace; Fig. 2 is a middle vertical section of the furnace taken at right angles to Fig. 1, parts being in elevation and partly broken, and being on a larger scale than Fig. 1; Fig. 3 is a top plan of the furnace; Fig. 4 is a horizontal section through the top hearth taken on the line 4—4 of Fig. 1; Fig. 5 is a similar section through the third hearth (from the top) or bottom oxidizing hearth, on the line 5—5 of Fig. 1; Fig. 6 is a sectional detail showing the coal-chute tapping the roof of the third hearth and discharging into the fourth hearth or first reduction hearth, the section being taken along a radial vertical plane through the axis of the furnace; Fig. 7 is a horizontal section taken through the lower muffle or combustion chamber on the line 7—7 of Fig. 1; and Fig. 8 is a horizontal section of the bottom hearth on the line 8—8 of Fig. 1.

The present invention is specifically directed to improvements in roasting furnaces of the rotary or McDougal type, which, as well understood in the art, comprise a series of superposed intercommunicating hearths in which the ore (or other material) treated in one hearth drops onto the hearth immediately beneath, the last or bottom hearth of the series discharging the finished product or calcine.

The object of our invention is to so modify the construction of a McDougal furnace as to make the same subserve not only the purpose of roasting the ore, but of reducing the oxids of the metals of the roasted calcines to the metallic state at temperatures below the point of fusion of the charge, whereby the resulting product is discharged from the furnace as a sponge or pulverulent mass, the metal constituent of which is distributed in the form of small particles throughout the gangue with which it is associated. A McDougal furnace so modified, is eminently adapted to treat iron sulfid ores, particularly pyrite from which a portion of the sulfur has been eliminated by subjecting the same to a partial preliminary roast in another furnace.

The improved furnace possesses further and other advantages which will become apparent from a detailed description of the invention which is as follows:—

Referring to the drawings, F represents the furnace, and $a$, $b$, $c$, $d$, $e$, $f$, the several superposed hearths or floors in which the material is treated (the present being a six-hearth multiple-hearth furnace of the McDougal type) the material dropping from the upper hearth successively through the several hearths until finally reaching the discharge hoppers D whence the reduced metal or sponge is discharged for further treatment. As well understood in the art the hearths are provided with central and marginal openings or drop-holes $o$, $o'$, respectively, for the passage of the material, the floor of the third hearth $c$ being provided with a single drop-hole $o''$ for conducting the roasted calcine to the fourth hearth $d$ where the reduction of the metallic oxids begins. The ore (partially roasted in another furnace) is delivered toward the center of the top hearth $a$ from a charging hopper H, a belt feeder 1 conveying the ore to the desired point in said hearth. As well understood in the art, the furnace is provided with a central hollow rotatable rabble-shaft 2 from which radiate the series of hollow rabble or stirrer arms 3 extending into the several hearths and carrying rakes 4, by which the material is successively fed from one hearth to the hearth immediately beneath it, the shaft and arms being provided with water (or air) circulating pipes P, P', respectively, by which the rabble apparatus is kept cool.

The mechanism by which rotation is imparted to the rabble-shaft and arms though here illustrated, is not described because well understood by those skilled in the art, and forming no part of the present invention. Neither is the driving mechanism for the belt-feeder 1 described (although illustrated) for the same reason.

At a convenient point opposite the furnace is mounted a coal hopper E which discharges onto a belt-feeder 5, the latter delivering the crushed coal to a chute 6 which in turn conveys the same through the floor of the hearth $c$ into the fourth hearth $d$, said chute tapping said floor at a point adjacent the drop hole $o''$, whereby the roasted calcine discharges from the hearth $c$ into the hearth $d$ in conjunction with the coal from the chute 6. The rakes 4 in said hearth $d$ move the calcine (oxidized ore and gangue) and coal toward the central drop hole $o$ in the floor of said hearth ($d$) and mix them thoroughly. It may be stated in passing that the driving mechanism for the belt-feeder 5 is actuated from the driving mechanism for the belt-feeder 1 by a belt B, whereby the coal is fed to the hearth $d$ concurrently with the feeding of the ore to the hearth $a$. Any equivalent driving mechanism for the feeds may however, be employed, no claim being made thereto as they are well understood in the art.

As pointed out above, the present is a combined roasting and reducing furnace, the charge passing from a sulfid to the oxid and finally to the metallic state as it descends through the successive hearths. Assuming that the ore to be reduced is pyrite, the ore is subjected to a preliminary roast in a separate furnace to get rid of the major portion of the sulfur, after which it is placed into the charging hopper H, and fed to the hearth $a$. In the hearths $a$, $b$, $c$, the partially roasted ore is subjected to further oxidation, the roasting or oxidation in these hearths being carried as far as desired (say to the point of eliminating all but a small percentage of the sulfur). The roasting in the upper hearths ($a$, $b$, $c$) converts the charge into an oxid of iron (barring of course, the small per cent. of sulfid which it may not be necessary to completely decompose for our purpose) which drops through the hole $o''$ onto the floor of the fourth hearth $d$. The roasting or oxidation of the charge in the hearths $a$, $b$, $c$, may be accomplished by any suitable direct-firing means; but in the present embodiment of our invention we prefer to fire these (roasting or oxidizing) hearths ($a$, $b$, $c$) by means of oil (or gas) flames, suitable provision being made for this purpose in the shape of pipes 7 disposed about the furnace and conducting the oil by means of nozzles $t$ to the air injectors or nozzles $n$ at the end of the air pipes 8, the inflammable mixture being projected and sprayed into the hearth $c$ through the hollow burners 9 in the furnace-walls, the nozzles $t$ and $n$ being provided with controlling valves $v$ as well understood in the art. In lieu of oil or gas, we may fire the hearth $c$ directly from a fire-box as shown in U. S. Patent on roasting furnace, Number 1,070,490, dated August 19, 1913, issued to Frederick Laist. A portion of the combustion products may escape from the hearth $c$ through an opening 10 into the uptake flue 11, the latter leading to the main flue 12 into which likewise discharge the gas-flues 13 by which the roaster gases from the oxidizing hearths ($a$, $b$, $c$) are led out of the furnace. The uptake-flue 11 is provided with a slide or damper 14' by which all, or a portion of the combustion products and gases from the combustion chambers (presently to be described) discharging into said flue, may be diverted into the hearth $c$, when it is desired to heat the oxidizing hearths direct by the gases from said chambers. In fact, the employment of the chamber gases constitutes one of the several ways by which the oxidizing hearths may be fired.

Interposed between hearths four ($d$) and five ($e$), and between hearths five ($e$) and six ($f$) are annular combustion chambers C, the roofs of the chambers constituting the floors of the hearths immediately above, and the floors of the chambers constituting the roofs of the hearths immediately beneath. The roofs of the chambers are flat with a slight downward slope toward the axis of the furnace, and are composed of tiles 14 laid so as to overlap one another, and supported by piers 15 of fire-brick resting on the floor of the chamber, the chambers being closed on the side adjacent the axis of the furnace, but opening at their peripheries or outer portions into the flue 11 through passage-ways or openings 10'. The chambers C are heated by oil burners 9' supplied with the proper mixture through the oil nozzles $t'$ and air nozzles $n'$ at the ends of the pipes 7' and 8' respectively, the pipes 8, 8', and 7, 7', each leading to independent sources of compressed air and oil supply respectively (not shown). In lieu of oil, gas or solid fuel may be used. Hearths four and five ($d$, $e$) are thus converted into muffles or muffle members being heated by the combustion chambers C, hearth six ($f$) not requiring to be heated, but is heat-insulated so as to conserve to the fullest extent possible the heat of the ore discharged thereinto from the upper hearths. Precaution is taken to exclude outside air from the lower (reduction) hearths ($d$, $e$, $f$); but this is not difficult of accomplishment as the gases of reaction in said hearths tend to keep the air out. These reaction gases escape through the flue 16 provided with a damper 17 normally set so as to prevent any suction, but rather to produce a slight gas pressure on these floors ($d$, $e$, $f$). The flue 16 is connected to the respective hearths $d$, $e$, $f$, by short pipes $p$ as shown. A hood 18 tapping the flue 16 is mounted over the coal chute 6 to catch any gases escaping therethrough, the gases collected by the hood being discharged into said flue 16 through pipe 18'.

In the operation of the furnace, the finely crushed and partially roasted ore (pyrite) is discharged from the hopper H onto the feeder 1, the latter conducting it (through a chute $w$) into hearth $a$, the rakes 4 of the rabble mechanism stirring the charge and causing the same to traverse the hearths $a$, $b$, $c$, the ore dropping through the marginal drop-holes $o'$ of the first hearth on to the second hearth, and through the central drop-hole $o$ of the second hearth onto the third hearth, which as before stated, is provided with a single marginal drop-hole $o''$ discharging the ore onto the fourth hearth. During the traverse of the ore charge through the hearths $a$, $b$, $c$, the metallic sulfid is thoroughly oxidized (to the point of elimination of most of the sulfur) the pyrite being converted into the form of oxid, usually a mixture of FeO and $Fe_2O_3$, the hearths $a$, $b$, $c$, being for convenience herein denominated as the roasting or oxidizing hearths. As the iron oxid and gangue drop through the hole $o''$ onto the hearth $d$ there is delivered at the same time to said hearth ($d$) the necessary complement of crushed coal discharged through the chute 6 (receiving its supply from the coal hopper E and belt-feeder 5) at a point adjacent (in front or behind) the drop-hole $o''$, the rakes 4 in said hearth $d$ (and in the hearths $e$, $f$) thoroughly mixing the ore and coal (or equivalent reducing agent), the slight slope of the floors of the hearths $d$, $e$, assisting the rakes to secure a thorough intermingling of the ore and coal, and allowing for expansion. As previously stated, the hearths $d$, $e$, (which together with the bottom hearth $f$ may for convenience be denominated as the reduction hearths) are heated from the chambers C, the heat imparted to the mixed charge of ore (iron oxid and gangue) and coal (or equivalent fuel) being sufficient to bring about the necessary reaction between the carbon (and hydrogen) of the fuel and the oxygen of the iron oxid. These reactions may be expressed substantially as follows:—

(a) $FeO+C=Fe+CO$.
(b) $Fe_2O_3+3C=2Fe+3CO$.

The pyrite roasted on the upper floors ($a$, $b$, $c$) is heated to a temperature between 1400 and 2000 degrees Fahrenheit and when mixed with the coal (in the fourth hearth $d$) the temperature of the mixture (traversing the reduction hearths) should be kept below the point of fusion of the charge (this point being substantially 1800 degrees Fahrenheit). The temperature at which carbon reduces iron oxid corresponds to that at which metallic iron decomposes vapor of water, and as there is always, or generally, moisture in the fuel, enough coal (or carbon or other reducing agents) should be added to the charge of ore to reduce the iron oxidized by the decomposition of the water, thus—

(c) $Fe+H_2O=FeO+2H$.
(d) $FeO+C=Fe+CO$.

From the foregoing reactions ($a$, $b$, $c$, $d$) it will be seen that the gases constituting the products of the reaction are in the main CO and H, the CO being of course, the principal product. These gases are conducted out of the hearths ($d$, $e$, $f$) through the pipes $p$ and flue 16, into the atmosphere or to any suitable point of consumption (not shown), the bottom of the flue 16 being closed and resting on the bottom floor L, the furnace being provided with a series of floors L, L', L'', (indicated conventionally) to obtain ready access to the different hearths.

The reactions of reduction above indicated (reactions $a$, $b$, $c$, $d$) assume of course, that no air is allowed to enter the hearths, $d$, $e$, $f$, for were air admitted, the oxygen thereof would reoxidize the metal (Fe), an objection not to be tolerated. These reactions further assume that the reduction hearths ($d$, $e$) derive their heat from the chambers C, C. We may however, dispense with the combustion chambers C and supply the necessary heat to these hearths ($d$, $e$) by feeding in an excess of carbon (coal) and admitting sufficient air to burn this excess, the heat from the burning fuel being sufficient to raise the temperature of the ore charge and the balance of the carbon to bring about the reducing reaction between the iron oxid and carbon. In that event the heat from this excess of burning carbon would simply take the place of the chambers. The air for burning this carbon excess could be admitted to one or all of the bottom floors (through the furnace doors A, or otherwise), in which event the coal (and gases therefrom) would burn directly in the charge itself or immediately over it.

In the practice of our invention the rate of travel or advance of the charge through the several hearths must necessarily be commensurate with the rate at which the roasting or oxidation and subsequent reduction can take place; and we find that by imparting to the rabble arms a speed of rotation of one to two revolutions per minute secures the desired result. The final reduction takes place of course in the bottom hearth ($f$) which does not require extraneous heating, but it should be properly insulated so as to conserve the heat inherent in the charge dropping into this hearth from the hearth above. In the hearth *f* the metal and gangue are raked toward the center, where they drop through the chutes *m* into the hoppers D. The rabble shaft and arms are preferably coated with a layer of fire clay or other poor conductor of heat (not shown). The final product of our process is a "sponge"—a mixture of iron and gangue—from which the metal may be recovered by means of a magnetic separator or by any other method known to the art.

Obviously, the atmosphere within the three lower or reduction floors *d, e, f*, must be a reducing one, and while we prefer to establish and maintain such an atmosphere by the construction of the chambers C operating without access of air to the said hearths, such an atmosphere may be established by dispensing with the chambers and employing an excess of carbon in conjunction with air admitted to burn this excess as above pointed out. We may also establish such a reducing atmosphere by dispensing with the chambers C and heating the hearths *d* and *e* by means of a reducing flame projected through the walls thereof (on the order of the oil burners for the hearth *c*, and chambers C), such reducing flame being made from oil, gas, coal, coal-dust or equivalent fuel. Our preference however is for the chambers C as shown, and the exclusion of air from the reduction hearths (*d, e, f*). By this preferred construction there is no oxygen to contend with, and hence no danger of reoxidation of any portion of the iron can arise. The doors A, when kept securely closed will suffice to exclude the outside air from the interior of these hearths (*d, e, f*).

It will be seen that the present furnace has at least three points of discharge for the gases, to-wit:—the uptake flue 11 which in the main conducts away the gases from the chambers C; the flues 13 which conduct away the roaster gases; and the flue 16 which removes the gases (CO and H) forming the by-products of the reducing reaction between the coal and iron oxids in the hearths *d, e, f*. A portion of the gases from the hearth *c* may escape through the passage 10 into the flue 11, the said passage 10 being availed of to fire the hearth *c* direct from the chambers C by closing the slide or damper 14 as already explained.

Whatever be the ultimate form of construction the furnace may assume, the roasting hearths *a, b, c*, will be heated by direct fire by means of the oil-burners 9 or their equivalents; the reduction hearths *d, e, f*, will have maintained therein a reducing atmosphere and be heated independently by the chambers C or by any of the equivalent methods pointed out above; and the furnace will be provided with suitable means affording escape for the various gases resulting from the several reactions involved in the successive steps of oxidation and reduction. The passages 10, 10', are provided with slide or damper openings *s* for obvious purposes.

The present furnace may be considered as a combined roasting and reducing metallurgical furnace of the McDougal type, combining as it does all the attributes of a McDougal roaster, with an apparatus treating an oxid of iron with suitable carbonaceous fuel to effect the reduction to the metallic state.

Features of furnace construction shown but not alluded to are well understood in the art and require no description in the present connection.

Having described our invention, what we claim is:

1. A combined oxidizing and reducing metallurgical furnace comprising a series of superposed intercommunicating hearths discharging successively into one another, a direct firing means coöperating with an intermediate hearth, a combustion chamber interposed between the hearth immediately beneath the direct-fired hearth and the next hearth below, a flue for discharging the waste gases from the combustion chamber to a point outside the furnace, and means in said flue for diverting such waste gases into the direct-fired hearth.

2. A combined oxidizing and reducing metallurgical furnace comprising a series of superposed intercommunicating hearths discharging successively into one another, means for direct-firing an intermediate hearth of the series, a muffle-hearth below the direct-fired hearth, means for conducting the waste gases from the combustion chamber identified with the muffle hearth to a point outside the furnace, and means for diverting said waste gases into the direct-fired hearth.

3. A combined oxidizing and reducing metallurgical furnace comprising a series of superposed intercommunicating hearths discharging successively into one another, means for direct-firing an intermediate hearth of said series, a muffle-hearth contiguous to said direct-fired hearth, a main waste-gas flue, means for conducting the waste gases from the combustion chamber identified with the muffle-hearth to said main flue, a gas flue for conducting the waste gases from the several oxidizing hearths to the main flue, means for diverting any desired portion of the waste gases from the muffle-hearth combustion chamber into the direct-fired hearth, and independent means for conducting away the waste gases from the muffle hearth.

4. A combined oxidizing and reducing metallurgical furnace comprising a series of superposed intercommunicating hearths discharging successively into one another, a direct-firing means coöperating with an intermediate hearth, combustion chambers interposed between the hearth immediately beneath the direct-fired hearth and the next hearth below and the last hearth and the succeeding lower hearth, means independent of the direct-firing means for heating said combustion chambers, an up-take-flue for conducting away the combustion products from said chambers, a damper in said flue, means below the damper for establishing communication between said flue and the direct-fired hearth, means for feeding carbonaceous fuel to the hearth immediately beneath the direct-fired hearth, means in the hearths below the direct-fired hearth for thoroughly commingling the fuel with the roasted charge delivered to said hearths, a flue for conducting the roaster gases from the direct-fired hearth and the hearths above the same, and means for conducting from said reduction hearths the gases evolved from the reaction of reduction.

5. A combined oxidizing and reducing metallurgical furnace comprising a series of superposed intercommunicating hearths discharging successively into one another, means for direct-firing an intermediate hearth of the series, a muffle-hearth contiguous to said direct-fired hearth, means for discharging at a point outside the furnace the waste gases of the muffle-heating means, means for conducting away the waste gases from the direct-fired hearth and hearths above the same, means for diverting the waste gases of the muffle-heating means into the direct-fired hearth, means for feeding reduction fuel to the muffle-hearth, and means for conducting away the gases evolved from the reaction of reduction to a point outside the furnace.

6. In combination with an upper direct-fired hearth traversed by the material to be treated, a lower muffle-hearth receiving the calcines from the upper hearth, means independent of the direct-firing means aforesaid for heating the muffle-hearth, means for conducting to the muffle-hearth a charge of reduction fuel, means in the muffle-hearth for mixing said fuel and calcines discharged thereinto from the upper hearth, a gas-discharge flue leading from the muffle-heating means to a point outside the furnace, and controllable means for establishing communication between said flue and the direct-fired hearth.

7. The combination with an upper direct-fired hearth traversed by the material to be treated, a lower muffle-hearth receiving the calcines from the upper hearth, means for heating the muffle-hearth, means for conducting to the muffle-hearth a charge of reduction fuel, means for mixing said fuel, and calcines discharged into the muffle-hearth, means for conducting any predetermined portion of the waste gases from the muffle-heating means to a point outside the furnace, means for diverting another portion of said gases into the direct-fired hearth and independent means for conducting away the gases from the direct-fired hearth.

8. The combination with an upper direct-fired hearth traversed by the material to be treated, a lower muffle-hearth receiving the calcines from the upper hearth, means for heating the muffle-hearth, means for conducting to the muffle-hearth a charge of reduction fuel, means for mixing said fuel, and calcines discharged into the muffle-hearth, means for normally conducting the waste gases from the muffle-heating means to a point outside the furnace, independent means for conducting away the waste gases from the direct-fired hearth, and means under the control of the operator for diverting the waste gases from the muffle-heating means into the direct-fired hearth.

In testimony whereof we affix our signatures in presence of two witnesses.

EDWARD P. MATHEWSON.
FREDERICK LAIST.

Witnesses:
E. M. DUNN,
MARTIN MARTIN.